US005612542A

United States Patent [19]
Brown et al.

[11] Patent Number: 5,612,542
[45] Date of Patent: Mar. 18, 1997

[54] ULTRAVIOLET LIGHT INTENSITY MONITOR

[75] Inventors: John F. Brown; Steve P. Gawne, both of Calgary, Canada

[73] Assignee: 649020 Alberta Ltd., Calgary, Canada

[21] Appl. No.: 487,519

[22] Filed: Jun. 7, 1995

[51] Int. Cl.⁶ .................................................. G01J 1/38
[52] U.S. Cl. ........................................................ 250/474.1
[58] Field of Search ........................... 250/474.1, 372 EM

[56] References Cited

U.S. PATENT DOCUMENTS

| | | | |
|---|---|---|---|
| 3,787,687 | 1/1974 | Trumble | 250/474.1 |
| 4,863,282 | 9/1989 | Rickson | 250/474.1 |
| 5,296,275 | 3/1994 | Goman et al. | 250/474.1 |

FOREIGN PATENT DOCUMENTS

| | | | |
|---|---|---|---|
| 71116 | 3/1994 | WIPO | 250/474.1 |

OTHER PUBLICATIONS

Joyce, Marilyn "Sticker Tells You When To Reapply The Sunscreen: Sun Spots Product Which Changes Colour When Sunscreen Reapplication Is Needed," Philadelphia Business Journal, Jun. 17, 1994, vol. 13, No. 16, p. 3, column 2.
SunDog Promotional Piece, Distributed at Commonwealth Games, Victoria British Columbia, Summer 1994.
A SunCast™ UV Monitor Sales brochure, Orbital Sciences Corp., Undated.
A SunCast ™ UV Monitor Sales brochure, Advanced Safety Devices, Inc., Undated.
"New UV Forecast Could Brighten Sun Case Sales", Drug Store News, Mar. 13, 1995.
Newsbites, Drug Store News, Jun. 5, 1995, p. 15.
Sunwatch UV Monitor, TWICE, Apr. 24, 1995, p. 94.

*Primary Examiner*—Carolyn E. Fields
*Attorney, Agent, or Firm*—Foley & Lardner

[57] ABSTRACT

The present invention provides a personal, portable and self-powered ultraviolet light intensity (UVI) monitor and a method for determining the duration of safe exposure to the sun or, alternatively, the value of the sun protection factor (SPF) of a sun protection product required for a given duration of exposure to the sun. The monitor is a substrate imprinted with indicia and non-uniformly overlaid with photosensitive material. Depending on the intensity of UV light to which the monitor is exposed, the photosensitive material changes physical characteristics and exposes some and conceals other indicia to indicate a duration of safe exposure to the sun for given conditions or the SPF value of the sun protection product used to be used, or both.

19 Claims, 1 Drawing Sheet

OVERCAST DAY

Recommended Exposure Time
Minutes

| S P F | | | | | |
|---|---|---|---|---|---|
| | 0 | 15 | 30 | 45 | 60 |
| | 8 | 45 | 60 | 75 | 90 |
| | 15 | 60 | 75 | 90 | 120 |
| | 30 | 90 | 120 | 135 | 2 HR |

FIG. 1

| | Recommended Exposure Time Minutes | | | | | |
|---|---|---|---|---|---|---|
| S P F | 0 | 15 | 30 | 45 | 60 | 75 |
| | 8 | 45 | 60 | 75 | 90 | 120 |
| | 15 | 60 | 75 | 90 | 120 | 135 |
| | 30 | 90 | 120 | 135 | 2 HR | 3 HR |

FIG. 2
OVERCAST DAY

| | Recommended Exposure Time Minutes | | | | |
|---|---|---|---|---|---|
| S P F | 0 | 15 | 30 | 45 | 60 |
| | 8 | 45 | 60 | 75 | 90 |
| | 15 | 60 | 75 | 90 | 120 |
| | 30 | 90 | 120 | 135 | 2 HR |

FIG. 3
BRIGHT DAY

| | Recommended Exposure Time Minutes | | | |
|---|---|---|---|---|
| S P F | 0 | 15 | 30 | 45 |
| | 8 | 45 | 60 | 75 |
| | 15 | 60 | 75 | 90 |
| | 30 | 90 | 120 | 135 |

FIG. 4
VERY SUNNY

| | Recommended Exposure Time Minutes | | |
|---|---|---|---|
| S P F | 0 | 15 | 30 |
| | 8 | 45 | 60 |
| | 15 | 60 | 75 |
| | 30 | 90 | 120 |

FIG. 5
EXTREME EXPOSURE

| | Recommended Exposure Time Minutes | |
|---|---|---|
| S P F | 0 | 15 |
| | 8 | 45 |
| | 15 | 60 |
| | 30 | 90 |

ULTRAVIOLET LIGHT INTENSITY MONITOR

FIELD OF THE INVENTION

The present invention relates to a device for monitoring the intensity of ultraviolet light. More specifically, the present invention relates to a personal, portable and self-powered monitor for determining the intensity of ultraviolet (UV) rays in order to indicate the time a person may safely spend in the sun or, alternatively, the value of the sun protection factor (SPF) of a sun protection product required for a given duration of exposure to the sun.

BACKGROUND OF THE INVENTION

Overexposure to UV rays originating from the sun (light rays of wavelength shorter than approximately 3800 angstroms) will cause human skin damage and is generally believed to be the leading cause of various types of skin cancer. UV intensity (UVI) varies according to a number of factors, including cloud cover, season, time of day, altitude, latitude and the thickness of ozone layer. The impact of UV rays on the human skin also varies according to a number of factors, including the UVI, the duration of exposure and the application of sun protection.

Although various types of UVI monitors are known, the complexity of design, size, cost and the need of a power source have restricted their use to specific scientific procedures. Simpler monitors do not provide any indication to the users how long they can safely stay in the sun or how that time may be lengthened through the use of a sun protection product.

It would be desirable to have a pocket size, inexpensive, self-powered and easy to use UVI monitor which would enable people to tell how long they could safely stay in the sun on any particular day and, if a sun protection product is used, how that time may be lengthened on the basis of the SPF value selected. Alternatively, such a monitor would enable people to chose a sun protection product having a SPF value required for a given duration of exposure to the sun. The present invention provides such a UVI monitor.

SUMMARY OF THE INVENTION

The present invention provides an ultraviolet light intensity monitor for determining the duration of safe exposure to the sun. The monitor comprises a substrate treated with photosensitive material, and imprinted with indicia denoting the duration of safe exposure to sun.

The present invention also provides an ultraviolet light intensity monitor for determining the duration of safe exposure to the sun after the application of a sun protection product. The substrate is imprinted with indicia representing a combination of the duration of exposure and the SPF value of a sun protection product.

The present invention further provides an ultraviolet light intensity monitor for determining SPF values required for given durations of exposure to the sun. The substrate is imprinted with indicia denoting SPF values corresponding to given durations of exposure to the sun.

The present invention provides a method of determining the duration of safe exposure to the sun. The method comprises imprinting a substrate with indicia denoting the duration of safe exposure to the sun; treating the substrate with varying densities of a photosensitive material so as to obtain discrete segments thereon having varying sensitivities to ultraviolet light, each segment corresponding to a specific indicium or set of indicia; exposing the treated substrate to the sun; and reading the duration of safe exposure to the sun for a specific set of conditions.

The present invention also provides a method of determining the duration of safe exposure to the sun after the application of a sun protection product. The method comprises imprinting a substrate with indicia representing a combination of the duration of exposure and the SPF value of a sun protection product; treating the substrate with varying densities of a photosensitive material so as to obtain discrete segments thereon having varying sensitivities to ultraviolet light, each segment corresponding to a specific indicium or set of indicia; exposing the treated substrate to the sun; and reading the duration of safe exposure to the sun for a specific SPF value.

The present invention further provides a method of determining the SPF value of a sun protection product required for a given duration of exposure to the sun. The method comprises imprinting a substrate with indicia denoting SPF values corresponding to given durations of exposure to the sun; treating the substrate with varying densities of a photosensitive material so as to obtain discrete segments thereon having varying sensitivities to ultraviolet light, each segment corresponding to a specific indicium or set of indicia; exposing the treated substrate to the sun; and reading the SPF value required for a given duration of exposure to the sun.

The substrate may be a plastic card, a device for connection to a container for a sun protection product, or an outside surface of a container for a sun protection product. In a preferred aspect of the invention, the substrate is a plastic card, for example a credit card-sized piece of plastic.

In another preferred aspect of the invention, the substrate is treated with varying densities of a photosensitive material, so as to obtain discrete segments thereon having varying sensitivities to ultraviolet light, each segment corresponding to a specific indicium or set of indicia. The photosensitive material may be a photosensitive ink, the density of the ink in each segment being such that, upon exposure to the sun, that segment is rendered opaque for a given ultraviolet light sensitivity.

In still other aspects of the invention, the indicia may be indicator numbers, indicator words, colours, or some combination thereof.

According to a further aspect of the present invention, the indicia may also relate to one of, or some combination of, altitude, latitude, season and skin type.

The present invention provides an ultraviolet light intensity monitor comprising a substrate imprinted with indicator numbers denoting the duration of safe exposure to the sun with or without a sun protection product of given sun protection factor value, the substrate being treated with a varying number of layers of a photosensitive ink so as to obtain discrete segments thereon, each segment having a different sensitivity to ultraviolet light, and each segment corresponding to a specific indicator number or set of numbers.

The present invention also provides an ultraviolet light intensity monitor comprising a credit card-sized piece of plastic imprinted with indicator numbers denoting the duration of safe exposure to the sun with or without a sun protection product of given sun protection factor value, the card being treated with a varying number of layers of a photosensitive ink so as to obtain discrete segments thereon having varying sensitivities to ultraviolet light, each segment corresponding to a specific indicator number or set of numbers.

The present invention provides a method of determining the duration of safe exposure to sun comprising imprinting a substrate with numbers denoting the duration of safe exposure to the sun, treating the substrate with varying densities of photosensitive ink so as to obtain discrete segments thereon having varying sensitivities to ultraviolet light, each segment corresponding to a specific number or set of numbers, exposing the treated substrate to the sun and reading the duration of safe exposure to the sun for a specific set of conditions.

The present invention also provides a method of determining the duration of safe exposure to sun comprising imprinting a credit card-sized piece of plastic with numbers denoting the duration of safe exposure to the sun, treating the piece of plastic with varying densities of photosensitive ink so as to obtain discrete segments thereon having varying sensitivities to ultraviolet light, each segment corresponding to a specific number or set of numbers, exposing the treated piece of plastic to the sun and reading the duration of safe exposure to the sun for a specific set of conditions.

The present invention further provides a method of determining the value of the sun protection factor of a sun protection product required for a given duration of safe exposure to sun comprising imprinting a substrate with numbers denoting the duration of safe exposure to the sun, treating the substrate with varying densities of photosensitive ink so as to obtain discrete segments thereon having varying sensitivities to ultraviolet light, each segment corresponding to a specific number or set of numbers, exposing the treated substrate to the sun and reading the value of the sun protection factor required for a given duration of safe exposure to the sun for a specific set of conditions.

The present invention also provides a method of determining the value of the sun protection factor of a sun protection product required for a given duration of safe exposure to sun comprising imprinting a credit card-sized piece of plastic with numbers denoting the duration of safe exposure to the sun, treating the piece of plastic with varying densities of photosensitive ink so as to obtain discrete segments thereon having varying sensitivities to ultraviolet light, each segment corresponding to a specific number or set of numbers, exposing the treated piece of plastic to the sun and reading the value of the sun protection factor required for a given duration of safe exposure to the sun for a specific set of conditions.

Other aspects and advantages of the present invention will become apparent from the detailed description of the invention and the preferred embodiments thereof.

BRIEF DESCRIPTION OF THE DRAWINGS

In accompanying drawings showing one of the preferred embodiments of the invention:

FIG. 1 depicts a UVI monitor according to the invention before exposure to the sun, FIG. 2 depicts the monitor of FIG. 1 after exposure to the sun on an overcast day, FIG. 3 depicts the monitor of FIG. 1 after exposure to the sun on a bright day, FIG. 4 depicts the monitor of FIG. 1 after exposure to the sun on a very sunny day, and FIG. 5 depicts the monitor of FIG. 1 after exposure to the sun on a day with extreme sun exposure.

DETAILED DESCRIPTION OF THE INVENTION

The present invention provides a monitor which offers a simple and repeatable measure of the intensity of ultraviolet rays. The monitor 10 of the present invention comprises a substrate 12. The substrate may be, for example, a credit card sized piece of plastic, a label for attachment to sun protection product containers, or the outside surface of a sun protection product container itself.

In one embodiment, the substrate is imprinted with indicia in a two dimensional array denoting the duration of safe exposure to the sun. The indicia may be numbers, letters, words, distinctive colours, etc., or some combination thereof. In the preferred embodiment, numbers 14 denoting periods of time are used. These times may be selected from those within parameters determined to be safe by dermatologists or medical associations. The duration of safe exposure to the sun may refer to exposure without protection, to exposure after applying a sun protection product of a specific SPF, or to both. Alternatively, the indicia may denote SPF values corresponding to specific durations of exposure to the sun.

The substrate is treated with overlapping and staggered layers of photosensitive material. In the preferred embodiment, the substrate is covered with differing amounts of a photosensitive ink. Photosensitive ink is reactive to UV rays, tending to become shaded or opaque upon exposure to UV light. The level of shade or opacity depends on UVI. The greater the number of layers of photosensitive ink on any particular segment of the monitor surface, the more reactive that segment will be upon exposure to UV light. Different segments of the monitor surface have discrete ink densities such that reaction with the ink in each segment will occur at a narrow range of UVI. The overlapping layers of photosensitive ink are staggered across the surface of the monitor, so that exposure of the monitor to the sun will reveal safe sun exposure times depending on the sun conditions as well as the type of sun protection product being used and SPF value indicated for such a product. The greater the UVI, the more segments of the monitor will be blocked out and the visible recommended times of exposure without skin damage will decrease.

In the preferred embodiment illustrated in the accompanying drawings, indicator numbers arranged along the horizontal axis denote different durations of the safe exposure to the sun, each line corresponding to a specific SPF value being arranged along the vertical axis (SPF "0" means that no protection is used). In the example given in FIG. 4, on a very sunny day, if a person wanted to spend 2 hours outside golfing, mowing the lawn, tanning, etc., the only acceptable sun protection product would be one with an SPF value of 30. Likewise, if the same person wanted to be outside for only an hour, a product with an SPF value of 8 would be sufficient.

For some embodiments of the invention, it may be possible for a user to roughly verify the SPF of a particular sun protection product by applying a layer of the product to the portion of the card for a "0" SPF, reading the appropriate indicia of safe exposure to the sun and comparing that to the indicia for the stated SPF of the product.

The actual times given in the example may vary depending on the latitude, altitude and thickness of the ozone layer as well as the time of year in any area as well as skin type. Therefore the exposure times may be adjusted for local or seasonal variations. They may also have to be adjusted for a particular manufacturer's sun protection product. They may also be adjusted for the skin type of the user.

On removal of the monitor from the sun, the ink returns to its transparent condition until the monitor is used again. The process may be repeated over and over again.

The present invention also provides a method of determining the duration of safe exposure to the sun. The method comprises imprinting a substrate, for example a credit card sized piece of plastic, a label for attachment to a sun protection product container, or the outside surface of a sun protection product container itself, with indicia (e.g. numbers, letters, distinctive colours, etc.) denoting the duration of safe exposure to the sun with or without a sun protection product of given SPF value; treating the substrate with a varying number of layers of photosensitive material so as to obtain discrete segments thereon having varying sensitivities to ultraviolet light, each segment corresponding to a specific duration of exposure to the sun; exposing the treated substrate to the sun; and reading the duration of safe exposure to the sun for a specific set of conditions.

Alternatively, the present invention provides a method of determining the SPF value of a sun protection product required for a given duration of exposure to the sun.

UVI monitors in the form of plastic cards and labels, or on the outside surface of a sun protection product container, should be considered only as examples of a preferred embodiment of the present invention. However, these embodiments are impervious to moisture, require no external power source, are easy to carry and are environmentally benign.

Similarly, the time indicia depicted in the drawings should be considered only as an example. As referenced above, the monitor may alternatively be designed to indicate the SPF value required for a given duration of exposure. Therefore, it is apparent that many modifications could be made without departing from the spirit and scope of the present invention as defined by the following claims.

What is claimed is:

1. An ultraviolet light intensity monitor comprising:
   a) a substrate,
   b) a two-dimensional array comprising a plurality of discrete areas formed on the substrate;
   c) indicia imprinted in the discrete areas indicating specific time levels of maximum recommended exposure to ultraviolet light;
   d) a legend setting out specific conditions associated with the time levels imprinted on the substrate adjacent to and forming a part of the array;
   e) each discrete area having a given density of photosensitive material forming discrete segments of the array,
   wherein, upon exposure to ultraviolet light, discrete areas including at least one segment will be activated in accordance with exposure level such that both the maximum recommended exposure time level corresponding to said exposure level and the specific condition associated with the maximum recommended exposure time level will be simultaneously viewed on the array.

2. An ultraviolet light intensity monitor according to claim 1, wherein the density of the photosensitive material in each segment is such that, upon exposure of that segment to the sun, the segment is rendered opaque for a given ultraviolet light sensitivity.

3. An ultraviolet light intensity monitor according to claim 2, wherein the photosensitive material is a photosensitive ink.

4. An ultraviolet light intensity monitor according to claim 3, wherein the indicia are indicator numbers.

5. An ultraviolet light intensity monitor according to claim 3, wherein the indicia represent a combination of the sun protection factor value and the duration of exposure.

6. An ultraviolet light intensity monitor according to claim 3, wherein the substrate is a plastic card.

7. A method of ascertaining recommended maximum exposure to ultraviolet light and associated recommended specific conditions, comprising:
   a) forming a two dimensional array comprising a plurality of discrete areas on a substrate;
   b) imprinting indicia on the substrate in the discrete areas indicating specific time levels of recommended maximum exposure to ultraviolet light;
   c) imprinting a legend on the substrate, setting out the specific conditions associated with the time levels, adjacent to and forming a part of the array;
   d) treating each discrete area with a given density of photosensitive material to form discrete segments of the array;
   e) exposing the treated substrate to ultraviolet light to activate at least one segment in accordance with exposure level; and
   f) simultaneously displaying the recommended exposure time level corresponding to said exposure level and the specific conditions associated with the recommended maximum exposure time level.

8. A method according to claim 7, wherein the indicia denote the duration of safe exposure to the sun alter the application of a sun protection product, the duration depending on the sun protection factor value of the product used.

9. A method according to claim 7, wherein the density of the photosensitive material in each segment is such that, upon exposure of that segment to the sun, the segment will be rendered opaque for a given ultraviolet light sensitivity.

10. A method according to claim 7, wherein the photosensitive material is a photosensitive ink.

11. A method according to claim 10, wherein the indicia are indicator numbers.

12. A method according to claim 10, wherein the indicia represent a combination of the duration of exposure and sun protection factor value of a sun protection product.

13. A method according to claim 10, wherein the substrate is a plastic card.

14. An ultraviolet light intensity monitor comprising:
   a substrate treated with various densities of photosensitive material so as to obtain discrete segments thereon having varying sensitivities to ultraviolet light, said segments being arranged in a two dimensional array such that the photosensitive material densities of said segments are progressive along at least one of a row or column of said array,
   a table of indicia imprinted on said substrate, each indication thereof being disposed at the location of a corresponding segment of photosensitive material and denoting a level of safe exposure to the sun; and
   a legend imprinted on said substrate proximate to said table for relating a specific set of conditions to the levels of safe exposure to the sun,
   wherein, upon the activation of a plurality of said segments when exposed to a given ultraviolet light intensity, indication levels exceeding maximum levels of safe exposure to the sun are masked for the corresponding set of conditions.

15. An ultraviolet light intensity monitor according to claim 14, wherein the density of the photosensitive material in each said segment is such that, upon exposure of such segment to the sun, the segment is rendered substantially opaque for a given ultraviolet light intensity.

16. An ultraviolet light intensity monitor according to claim 14, wherein the photosensitive material is a photosensitive ink.

17. An ultraviolet light intensity monitor according to claim 16, wherein the indicia are indicator numbers.

18. An ultraviolet light intensity monitor according to claim 16, wherein the indicia represent a combination of the duration of exposure and the sun protection factor value of a sun protection product.

19. An ultraviolet light intensity monitor according to claim 16, wherein the substrate is a plastic card.

* * * * *